US006715600B2

United States Patent
Ronchi

(10) Patent No.: US 6,715,600 B2
(45) Date of Patent: Apr. 6, 2004

(54) DEVICE FOR GRIPPING CONTAINERS ALIGNED IN SINGLE FILE AND FOR FEEDING THEM TO A PLURALITY OF PARALLEL PATHWAYS

(75) Inventor: Cesare Ronchi, Cassina de' Pecchi (IT)

(73) Assignee: Ronchiteck, S.r.l., Gessate (IT)

(*) Notice: Subject to any disclaimer, the term of this patent is extended or adjusted under 35 U.S.C. 154(b) by 59 days.

(21) Appl. No.: 10/094,609

(22) Filed: Mar. 12, 2002

(65) Prior Publication Data

US 2002/0139638 A1 Oct. 3, 2002

(51) Int. Cl.[7] ............................................... B65G 47/26
(52) U.S. Cl. ........................................ 198/436; 221/253
(58) Field of Search .......................... 221/7, 9, 15, 92, 221/112, 119, 253, 289; 198/436, 452, 817

(56) References Cited

U.S. PATENT DOCUMENTS 4,846,336 A * 7/1989 Hoyland et al. ............ 198/432

FOREIGN PATENT DOCUMENTS

EP          0480436    *   4/1992
GB          2 092 978       8/1982

* cited by examiner

Primary Examiner—Kenneth W. Noland
(74) Attorney, Agent, or Firm—Dykema Gossett PLLC

(57) ABSTRACT

Device for gripping containers in single file and for feeding them to a plurality of pathways parallel to each other and to a feeding direction, which comprises a frame supporting belts for gripping and force-feeding the containers inside the device, the frame being connected to a slide for moving it in a direction transverse to the feeding direction, there also being provided a pin for rotationally connecting the device to a deviating arm for guiding the containers, arranged upstream of the feeding device.

20 Claims, 3 Drawing Sheets

DEVICE FOR GRIPPING CONTAINERS ALIGNED IN SINGLE FILE AND FOR FEEDING THEM TO A PLURALITY OF PARALLEL PATHWAYS

DESCRIPTION

The present invention relates to a device for taking up containers arranged in single file and introducing them into a plurality of pathways which are parallel to each other and to a feeding direction, in particular in machines for creating arrays of containers.

It is known in the technical sector relating to the packaging of containers of various shapes such as bottles, phials and the like that there exists the need to arrange them in alignment in arrays formed by a predefined number of rows and columns depending on the dimensions of the packaging boxes inside which they must be inserted.

Automatic machines provided for this purpose are also known, said machines being essentially divided into two-sections arranged alongside and synchronised with each other: in the first of said sections the arrays of containers are formed, while in the second section the box to be filled is formed, the connection between the said sections being realised by a head for gripping and inserting the array, already formed, inside the box.

In greater detail, the formation of the rows is determined by an arm for deviating containers aligned in single file on a longitudinal feeding belt, said deviating means being movable rotationally in a direction transverse to the longitudinal direction of feeding of the containers and therefore able to cause channelling of the individual containers inside one or more storage pathways which are all parallel to the feeding direction and delimited by longitudinal sidewalls arranged above a corresponding conveyor belt.

Although performing their intended function, these machines have the drawback, however, that the said deviating arm is formed by two static, mutually parallel parts for holding the containers aligned in single file on the conveyor belt which transports them towards the point of introduction into the respective storage pathway.

Said arm moreover, at its end remote from the sidewalls delimiting said pathways, is hinged so as to be rotatable and thus bring the end where the container exits into substantial alignment with the entry end of the pathways of the multiple-row section of the machine.

As a result of said rotation, however, the arm may be arranged in parallel alignment with only one of the individual pathways (the central one), while with all the other pathways it forms an angle which becomes increasingly greater the more the said movable part of the arm moves towards the outermost pathways relative to the longitudinal axis.

Consequently when the containers must leave the feeding arm and enter into the respective pathway they are obliged to change direction, hitting the walls of the pathways and causing slowing down in the feeding movement of the containers and/or stoppage thereof with consequent blockage of the entire machine.

This basically prevents an increase in the speed of feeding of the containers in order to increase the overall productivity of the machine.

The technical problem which is posed therefore is that of designing a device for feeding containers arranged in single file to a plurality of parallel channelling pathways, which is able to provide a solution to the abovementioned problems, allowing an increase in the speed of feeding of the containers and an improvement in the direction of passing movement of the container from the deviating arm to the corresponding channelling pathway.

Within the context of this problem a further requirement is that said device should be simple to manufacture on an industrial level and easily applicable to already existing machines without the need for major modifications and/or adaptation.

These technical problems are solved according to the present invention by a device for gripping containers arranged in single file and for introducing them into a plurality of pathways parallel to each other and to a feeding direction, which comprises a frame supporting means for gripping and force-feeding said containers inside the device, said frame being connected to means for moving it in a direction transverse to the said feeding direction, there also being provided means for rotationally connecting the device to a deviating arm for guiding the containers in single file, arranged upstream of the feeding device.

Further details may be obtained from the following description of a non-limiting example of embodiment of the invention, provided with reference to the accompanying plates of drawings, in which.

Figure 1:
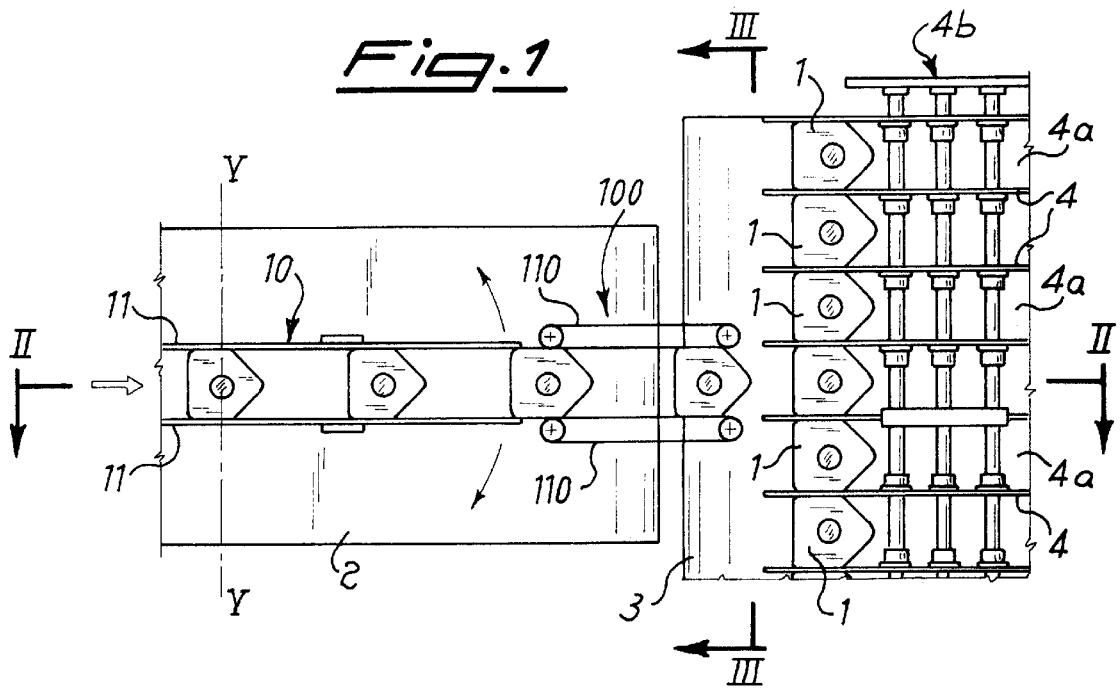
FIG. 1 shows a schematic cross-section along the plane indicated by I—I in FIG. 2.
Figure 2:
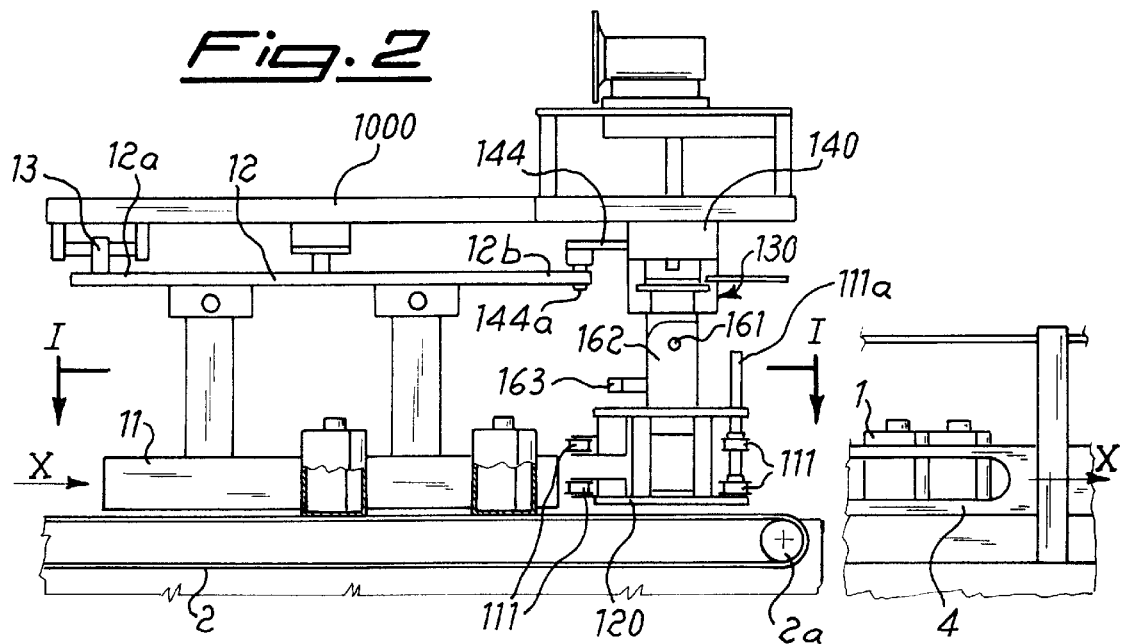
FIG. 2 shows a schematic cross-section along the plane indicated by II—II in FIG. 1.

As illustrated, the machine for forming parallel rows of containers 1 is schematically and essentially formed by the following:

a first conveyor belt 2 which is endless wound around two pulleys 2a, one of which is motor-driven, and above which a deviating arm 10 is arranged; and a second conveyor belt 3 above which dividing walls 4 are arranged, said dividing walls being parallel to each other and to the feeding direction coinciding with the longitudinal axis X—X of the machine.

Said dividing walls 4, which are movable in the transverse direction Y—Y by means of associated actuating devices schematically denoted by 4b, define corresponding channelling pathways 4a with a width corresponding to the transverse dimension of the container being processed. This machine section comprising multiple pathways will also be called "multiple-row section" below.

Said deviating arm 10 is essentially formed by two vertical sidewalls 11 parallel to each other and respectively connected to an upper rod 12 which is substantially parallel to the belt 2 and the end of which 12a, remote from the multiple-row section of the machine, is pivotably mounted on a fixed pin 13 so that the end 12b of the arm close to the multiple-row section is able to rotate freely.

The device 100 according to the invention for aligning containers 1 with each of said pathways 4a of the multiple-row section of the machine is arranged between the deviating arm 10 and the multiple-row section of the machine located above the second belt 3.

Said device essentially consists of: at least one pair of belts 110 which are endlessly wound around respective pulleys 111 and at least one of which is motorized by means of an associated transmission member—schematically denoted by 11a—connected to actuating means which allow the belts to be rotated at a regulated speed, as will be clarified better below.

Figure 3:
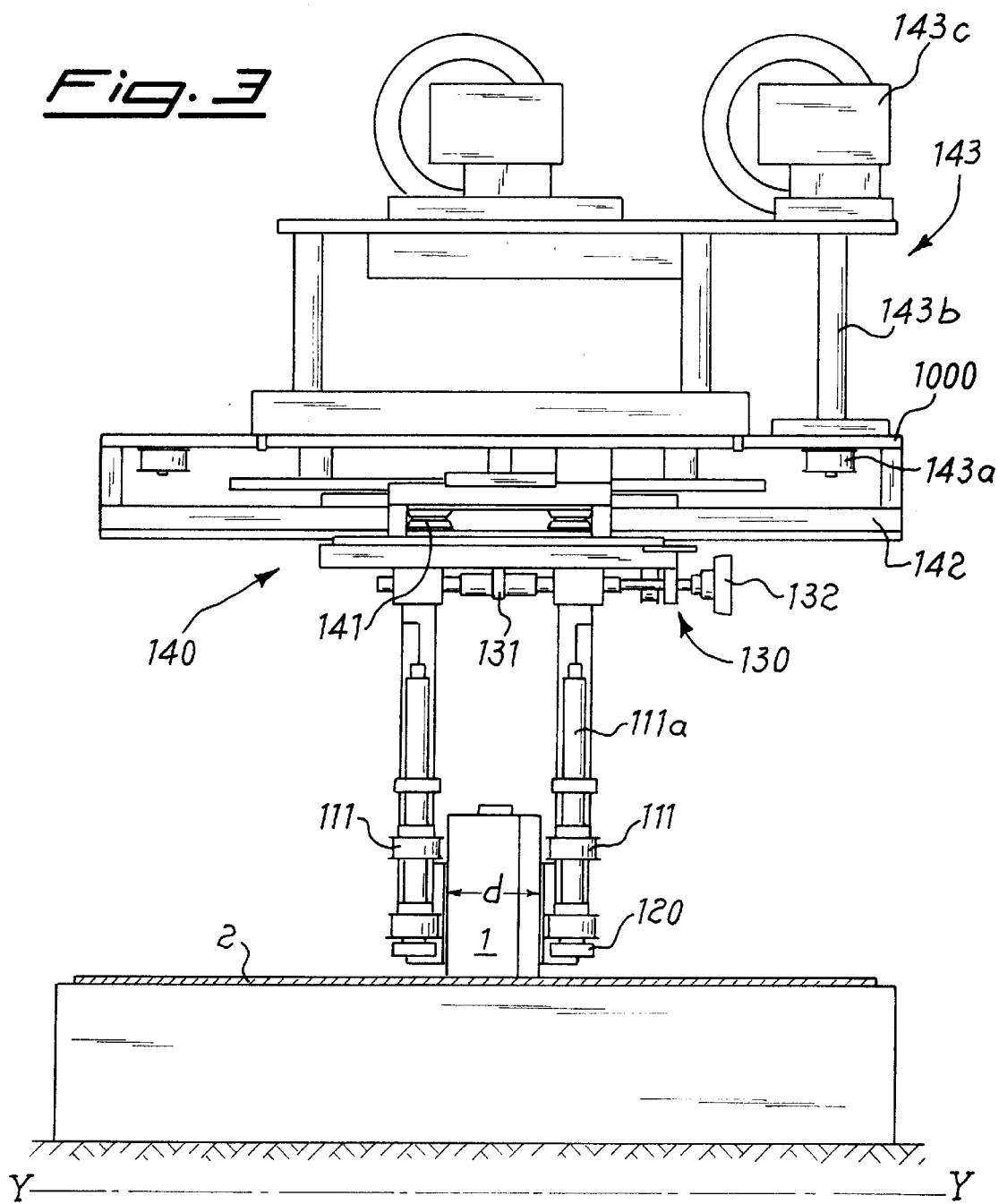
FIG. 3 shows a schematic cross-section along the plane indicated by III—III in FIG. 1.

Said belts 110 are arranged parallel to the feeding direction X—X and mounted on a support frame 120 provided with means 130 for adjusting the relative distance of the two belts 110 in the transverse direction Y—Y of the machine, so as to be able to regulate said distance according to the transverse dimension "d" of the container (FIG. 3).

Said means 130 for adjusting the relative distance of the belts are per se conventional and only schematically illustrated in FIG. 3 in the form of screw/female-thread means 131 and a control knob 132. The entire support frame 120 is joined to a slide 140 provided with rollers 141 able to guide the movement, in the transverse direction Y—Y, of the slide itself on a transverse rail 142 joined to the fixed frame 1000 of the machine.

Said slide is also connected to associated actuating means 143 which are schematically illustrated as a pulley 143a, a transmission member 143b and a gearmotor 143c able to cause translation of the slide itself and therefore the entire device 100 in the transverse direction Y—Y.

The slide 140 also has a flange 144 which extends towards the said rod 12 of the deviating arm 10 and is connected to the rod 12 itself by means of a vertical pin 144a able to allow relative rotation of the end 12b of the rod with respect to the device 100.

Figure 4:
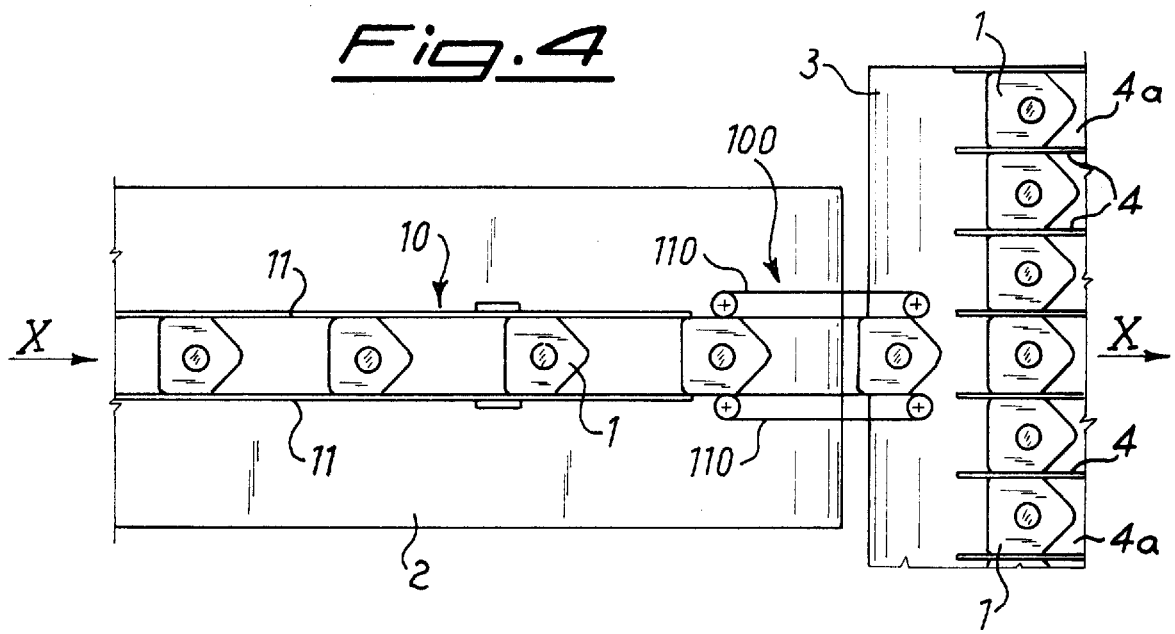
FIG. 4 shows a plan view of the machine with the deviating arm parallel to the direction of feeding (XX)
Figure 5:
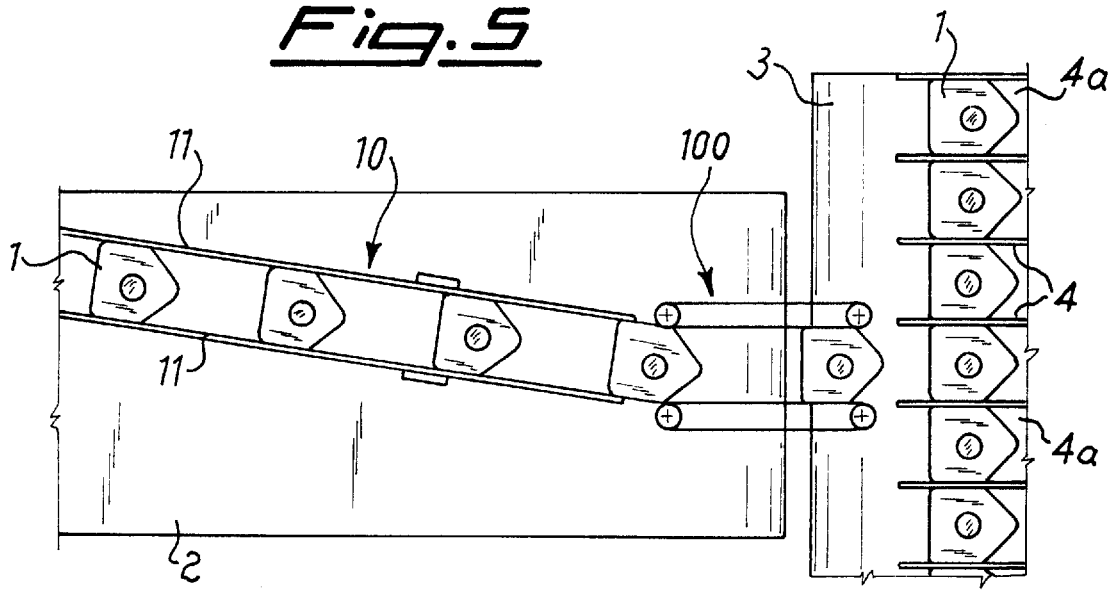
FIG. 5 shows a plan view of the machine with the deviating arm in an angled position with respect to the direction of feeding (X—X).

The operating principle of the machine is as follows:
the containers 1 are fed by the belt 2 and brought inside the sidewalls 11 so as to be all correctly aligned in single file in the feeding direction X—X (FIG. 1);
once the container has reached the front end of the deviating arm 10, it passes inside the device 100 from where it is removed by means of the rotating belts 110;
at the same time (FIGS. 4 and 5) the slide 140 is actuated translationwise so as to bring the device 100 into alignment with any one of the pathways 4a of the multiple-row section of the machine and cause the container 2 to enter into the corresponding pathway 4a. As can be seen from FIGS. 3 and 4, when the container passes from the device 100 to the pathway 4a, it is always aligned with the feeding direction X—X, whereas the condition of misalignment with the feeding direction occurs during the moment when the container 1 passes from the arm 10 to the device 100.

This angle between the longitudinal axis of the container (FIG. 5) and the feeding direction X—X does not have negative effects, however, since, during transit from the arm 10 to the device 100, the container is gripped by the rotating belts 111 and then conveyed inside the device 100 which, during transit, aligns the container with the feeding direction.

In addition to this, the adjustment of the speed of the belts 111, which may be greater than the speed of the conveyor belt, allows the productivity of the machine to be further increased.

It can therefore be seen how the passing movement of the container from the arm 10 to the device 100, which passing movement is made dynamic by the belts 11, reduces considerably the possibility of stoppage of the container owing to its angled position, compared to the static passing movement from the arm 10 to the pathways 4a delimited by fixed dividing walls, as performed in the known art.

It is also envisaged that the assembly 100 comprises safety means able to stop the feeding belt should a container nevertheless become jammed during transit. These means essentially consist of a fixed pin 161 to which the frame 120 is hingeably fastened by means of a flange 162 on which an interceptor element 163 associated with a corresponding emitter (not shown) is also mounted.

If a bottle should cause stoppage in the feed movement, the following containers, supplied by the arm, push the frame 120, causing it to rotate about the pin 161 with a consequent displacement of the interceptor element 163 which, no longer intercepting the signal emitted by the emitter, generates a signal which stops the machine.

What is claimed is:

1. Device for gripping container arranged in single file on feeding means and for introducing the containers into a plurality of pathways parallel to each other and to a feeding direction comprising a frame supporting means for gripping and force-feeding said containers inside the device, said frame being connected to means for moving the frame in a direction transverse to the said feeding direction and means for rotationally connecting the device to a deviating arm for guiding the containers in single file, arranged upstream of the gripping and feeding device.

2. Device according to claim 1, wherein said means for gripping and feeding the containers comprise at least one pair of belts disposed parallel to each other and to the feeding direction and being endless wound around respective pulleys.

3. Device according to claim 2, wherein at least one of said pulleys is motor-driven.

4. Device according to claim 1, wherein said means are actuated at a speed regulated in relation to the speed of feeding of the containers.

5. Device according to claim 4, wherein means are provided for effecting the speed of the belts as greater than the feed speed of the containers.

6. Device according to claim 1, wherein said frame is provided with means for adjusting the relative distance, in the direction transverse to the feeding direction, of the said means for gripping and feeding the containers inside the device.

7. Device according to claim 6, wherein said means for adjusting the relative distance comprise screw/female-thread elements which can be actuated by means of a control knob.

8. Device according to claim 1, wherein said means for moving the support frame in a direction transverse to the feeding direction comprise a slide movable translationwise, upon actuation of associated means, along a fixed transverse rail.

9. Device according to claim 1, wherein said means for connecting the device to said deviating arm comprise a pin which is substantially perpendicular to the feeding plane of the containers and to which the ends of a flange joined to the device and a rod joined to the arm are rotationally fastened.

10. Device according to claim 1, wherein the device comprises safety means for stopping the feeding movement of the containers.

11. Device according to claim 10, wherein said safety means comprise a pin which is arranged in a transverse direction and on which the frame supporting the feeding means is hingeably mounted, and further comprise devices for the emitting signals which can be intercepted by means of associated elements.

12. Device according to claim 1, wherein the rotation of said frame about the said pin causes the interception/non-interception of the said signals, generating a single stopping the means feeding the containers.

13. Machine for feeding, to a plurality of pathways, parallel to a feeding direction, containers arranged in single file and moved by means of a conveyor belt to a deviating arm for guiding the single file of containers, comprising a device for taking up the containers from the deviating arm in any direction of relative orientation thereof with respect to the feeding direction and introduction of the containers into each pathway in a direction parallel to the feeding direction, a first conveyor belt for feeding the containers in single file to the device for taking up/inserting the containers into the individual pathways and a second belt for feeding the containers arranged inside the pathways parallel to the feeding direction.

14. Machine according to claim 13, wherein said first and second belts have different speeds.

15. Machine according to claim 13, wherein the transverse line for passage from one belt to the other is arranged in a position corresponding to a zone inside the take-up/insertion device.

16. Machine according to claim 13, wherein said device is rotationally connected to the deviating arm for guiding the containers in single file.

17. Machine for feeding, to a plurality of pathways, parallel to a feeding direction, containers arranged in single file and moved by means of a conveyor belt to a deviating arm for guiding the single file of containers, comprising a device for taking up the containers from the deviating arm in any direction of relative orientation thereof with respect to the feeding direction and introduction of the containers into each pathway in a direction parallel to the feeding direction, wherein said take-up/insertion device comprises a frame supporting means for force-feeding the containers inside the device, said frame being connected to means for moving the frame in a direction transverse to said feeding direction, and said means for force-feeding the containers comprise at least one pair of belts parallel to each other and to the feeding direction and endlessly wound around respective pulleys.

18. Machine according to claim 17, further comprising means for effecting the speed of rotation of the belts as different from the feed speed of the conveyor belts.

19. Machine according to claim 18, further comprising means for effecting said speed of the belts as greater than the feed speed of the containers.

20. Machine for feeding, to a plurality of pathways, parallel to a feeding direction, containers arranged in single file and moved by means of a conveyor belt to a deviating arm for guiding the single file of containers, comprising a device for taking up the containers from the deviating arm in any direction of relative orientation thereof with respect to the feeding direction and introduction of the containers into each pathway in a direction parallel to the feeding direction, wherein the relative distance between said means for feeding the containers inside the device is adjustable according to a transverse dimension of the container.

* * * * *